United States Patent
Kim et al.

(10) Patent No.: US 9,484,737 B2
(45) Date of Patent: Nov. 1, 2016

(54) PROTECTOR OF RECTIFIER AND WIRELESS POWER RECEIVER INCLUDING PROTECTOR

(75) Inventors: Dong Zo Kim, Yongin-si (KR); Sang Wook Kwon, Seongnam-si (KR); Yun Kwon Park, Dongducheon-si (KR); Eun Seok Park, Suwon-si (KR); Young Tack Hong, Seongnam-si (KR); Ki Young Kim, Yongin-si (KR); Young Ho Ryu, Yongin-si (KR); Nam Yun Kim, Seoul (KR); Jin Sung Choi, Gimpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 955 days.

(21) Appl. No.: 13/327,193

(22) Filed: Dec. 15, 2011

(65) Prior Publication Data
US 2012/0153903 A1    Jun. 21, 2012

(30) Foreign Application Priority Data
Dec. 16, 2010    (KR) .................. 10-2010-0129099

(51) Int. Cl.
  *H02J 7/04*    (2006.01)
  *H02H 7/125*    (2006.01)
  *H02J 5/00*    (2016.01)
  *H02J 7/02*    (2016.01)

(52) U.S. Cl.
  CPC ............. *H02H 7/1252* (2013.01); *H02J 5/005* (2013.01); *H02J 7/025* (2013.01)

(58) Field of Classification Search
  USPC ....................................................... 320/148
  See application file for complete search history.

(56) References Cited

U.S. PATENT DOCUMENTS

| 5,406,468 A | * | 4/1995 | Booth ............................. 363/15 |
| 5,929,615 A | * | 7/1999 | D'Angelo et al. ............ 323/224 |
| 6,798,175 B2 | * | 9/2004 | Hanada et al. ................ 320/166 |
| 7,684,223 B2 | * | 3/2010 | Wei ................................ 363/143 |
| 2005/0116545 A1 | | 6/2005 | Hamel et al. |
| 2005/0253556 A1 | * | 11/2005 | Kuiri ..................... H02J 7/0031 320/128 |

FOREIGN PATENT DOCUMENTS

| JP | 2008-035596 | 2/2008 |
| JP | 2010-035371 | 2/2010 |
| KR | 1020040085019 | 10/2004 |
| KR | 1020070081515 | 8/2007 |
| KR | 10-2010-0098715 A | 9/2010 |

OTHER PUBLICATIONS

Korean Office Action issued on Aug. 30, 2016 in counterpart Korean Patent Application No. 10-2010-0129099 (6 pages in English; 5 pages in Korean).

\* cited by examiner

*Primary Examiner* — Robert Grant
(74) *Attorney, Agent, or Firm* — NSIP Law

(57) ABSTRACT

A protector that protects a rectifier, and a wireless power receiver including the protector are provided. In one embodiment, a protector for an electronic device may include: a switch configured to control current flow to a rectifier of the electronic device; and a switch controller configured to: compare, with a predetermined threshold value, a voltage difference between an output voltage of the rectifier and a voltage of the electronic device; and transmit a control signal to the switch (i) to discontinue current flow to the rectifier when the voltage difference is greater than the predetermined threshold value, and (ii) to enable current flow to rectifier when the voltage difference is less than or equal to the predetermined threshold value.

10 Claims, 14 Drawing Sheets

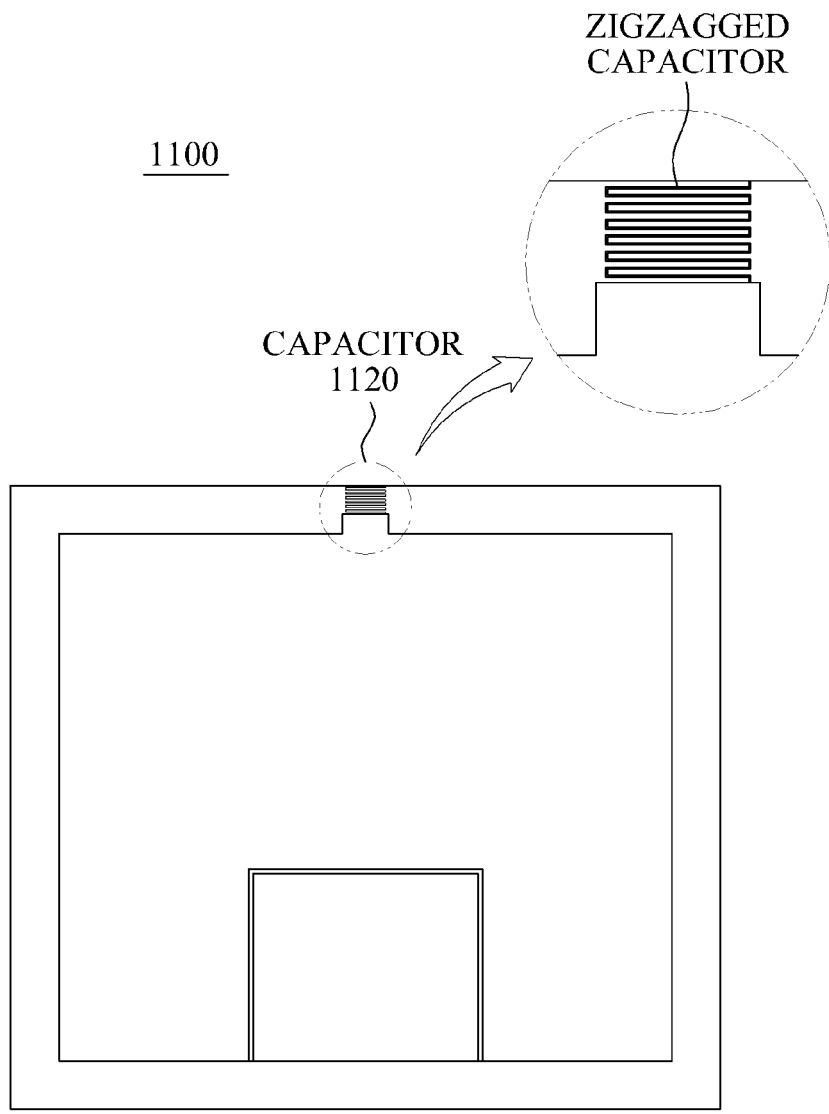

PROTECTOR OF RECTIFIER AND WIRELESS POWER RECEIVER INCLUDING PROTECTOR

CROSS-REFERENCE TO RELATED APPLICATION(S)

This application claims the benefit under 35 U.S.C. §119 (a) of Korean Patent Application No. 10-2010-0129099, filed on Dec. 16, 2010, in the Korean Intellectual Property Office, the entire disclosure of which is incorporated herein by reference for all purposes.

BACKGROUND

1. Field

The following description relates to a protector for protecting a rectifier, which may be used in a wireless power receiver.

2. Description of Related Art

Attention to wireless power transmission has increased. For instance, various products, such as, for example, high power applications that consume power in excess of 100 W, low power applications that consume power less than 10 W, and the like, have been studied.

Typically, high-power devices (e.g., consuming power from 50 W to 100 W) may not include a battery, and may use power by wirelessly receiving and converting the received power to an operational power. On the other hand, mobile devices (e.g., consuming power less than 10 W) generally include a battery and wireless power may be used to charge the battery. Most batteries used for the mobile devices (e.g., consuming power less than 10 W) include a protection circuit module (PCM). The PCM performs a self-protection function by disconnecting a charging path to protect a battery cell when over-charging, over-discharging, or over-current occurs.

When a battery is completely charged, the PCM of the battery may operate to block further power inputted to the battery.

Typically, an impedance of the battery may be several kiloohms (kΩ)s and therefore an input voltage of a direct current/direct current (DC/DC) converter may be greater than several dozens of voltages. However, the input voltage may exceed an internal pressure of a capacitor of a rectifier, which is generally about 30 V. As a result, when the PCM of the battery operates to block the power inputted to the battery, the capacitor may be destroyed and/or the DC/DC converter may be damaged by receiving a voltage greater than a maximum input voltage level.

SUMMARY

In one general aspect, a protector for an electronic device may include: a switch configured to control current flow to a rectifier of the electronic device; and a switch controller configured to: compare, with a predetermined threshold value, a voltage difference between an output voltage of the rectifier and a voltage of the electronic device; and transmit a control signal to the switch (i) to discontinue current flow to the rectifier when the voltage difference is greater than the predetermined threshold value, and (ii) to enable current flow to rectifier when the voltage difference is less than or equal to the predetermined threshold value.

The switch may be configured to enable current flow to a rectifier when the switch is turned on, and to prevent current flow to the rectifier when the switch is turned off.

The switch may include a p-channel metal-oxide semiconductor (PMOS) transistor.

The switch controller may include: a voltage divider configured to divide a voltage from the output voltage of the rectifier, and to output the divided voltage; a voltage adjustor configured to adjust the voltage of the electronic device to a predetermined voltage; and a comparator configured to compare the predetermined voltage with the divided voltage, to output the predetermined voltage, as a control voltage that controls the switch, when the predetermined voltage is less than or equal to the divided voltage, and to output a control voltage, as the control signal, when the predetermined voltage is greater than the divided voltage.

The control voltage may be about 0 V.

The voltage divider may be configured to divide the output voltage from the output voltage of the rectifier by a predetermined ratio and to output the predetermined ratio of the output voltage as the divided voltage.

The predetermined ratio may be about 1/3.

The predetermined voltage may be about 3.3 V.

The protector may further include: a resistor configured to prevent an over-current between the switch and the switch controller.

The protector may further include: a resistor configured to provide a resistance to maintain the switch in an on position.

In another general aspect, a wireless power receiver may include: a target resonator configured to receive electromagnetic energy from a source resonator; a rectifier configured to rectify the energy, received from the target resonator, to generate a DC signal; and a switch configured to control current flow from the target resonator to the rectifier.

The wireless may further include: a switch controller configured to: compare, with a predetermined threshold value, a voltage difference between an output voltage of the rectifier and a voltage of wireless power receiver; and transmit a control signal to the switch (i) to discontinue current flow to the rectifier when the voltage difference is greater than the predetermined threshold value, and (ii) to enable current flow to rectifier when the voltage difference is less than or equal to the predetermined threshold value.

The wireless power receiver may further include: a direct current/direct current (DC/DC) converter configured to adjust a signal level of the DC signal and to output a rated voltage.

The wireless power receiver may further include: a battery configured to receive the rated voltage outputted from the DC/DC converter, to charge the battery with the received rated voltage, and to block the rated voltage outputted from the DC/DC voltage when the charging of the battery is completed.

The switch may be configured to enable current flow to a rectifier when the switch is turned on, and to prevent current flow to the rectifier when the switch is turned off.

The switch may include a p-channel metal-oxide semiconductor (PMOS) transistor.

The switch controller may include: a voltage divider configured to divide a voltage from the output voltage of the rectifier, and to output the divided voltage; a voltage adjustor configured to adjust the voltage of the electronic device to a predetermined voltage; and a comparator configured to compare the predetermined voltage with the divided voltage, to output the predetermined voltage, as a control voltage that controls the switch, when the predetermined voltage is less than or equal to the divided voltage, and to output a control voltage, as the control signal, when the predetermined voltage is greater than the divided voltage.

The control voltage may be about 0 V.

The voltage divider may be configured to divide the output voltage from the output voltage of the rectifier by a predetermined ratio and to output the predetermined ratio of the output voltage as the divided voltage.

The predetermined ratio may be about 1/3.

The predetermined voltage may be about 3.3 V.

Other features and aspects may be apparent from the following detailed description, the drawings, and the claims.

BRIEF DESCRIPTION OF THE DRAWINGS

FIGS. 6 through 12 are diagrams illustrating various resonator structures.

Figure 1:
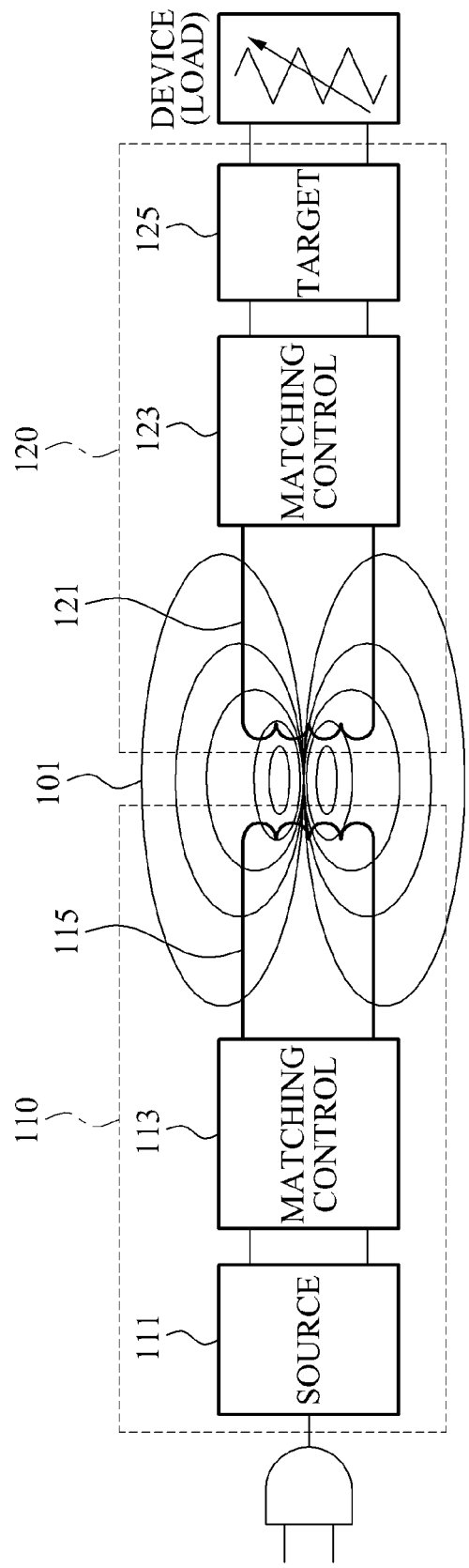
FIG. 1 is a diagram illustrating a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission system.

In one or more embodiments, wireless power transmitted may be resonance power.

As shown in FIG. 1, the wireless power transmission system may have a source-target structure including a source and a target. For example, the wireless power transmission system may include a resonance power transmitter 110 corresponding to the source and a resonance power receiver 120 corresponding to the target.

The resonance power transmitter 110 may include a source unit 111 and a source resonator 115. The source unit 111 may be configured to receive energy from an external voltage supplier to generate a resonance power. In some instances, the resonance power transmitter 110 may further include a matching control 113 to perform resonance frequency or impedance matching.

The source unit 111 may include an alternating current (AC)-to-AC (AC/AC) converter, an AC-to-direct current (DC) (AC/DC) converter, and/or a (DC/AC) inverter. The AC/AC converter may be configured to adjust, to a desired level, a signal level of an AC signal input from an external device. And the AC/DC converter may output a DC voltage at a predetermined level by rectifying an AC signal output from the AC/AC converter. The DC/AC inverter may be configured to generate an AC signal (e.g., in a band of a few megahertz (MHz) to tens of MHz) by quickly switching a DC voltage output from the AC/DC converter. Of course, other frequencies of AC power are also possible. The matching control 113 may be configured to set at least a resonance bandwidth of the source resonator 115, an impedance matching frequency of the source resonator 115, or both. In some implementations, the matching control 113 may include at least one of a source resonance bandwidth setting unit and a source matching frequency setting unit. And the source resonance bandwidth setting unit may set the resonance bandwidth of the source resonator 115. The source matching frequency setting unit may set the impedance matching frequency of the source resonator 115. For example, a Q-factor of the source resonator 115 may be determined based on setting of the resonance bandwidth of the source resonator 115 or setting of the impedance matching frequency of the source resonator 115.

The source resonator 115 may be configured to transfer electromagnetic energy to a target resonator 121. For example, the source resonator 115 may transfer the resonance power to the resonance power receiver 120 through magnetic coupling 101 with the target resonator 121. Accordingly, the source resonator 115 may be configured to resonate within the set resonance bandwidth.

As shown, the resonance power receiver 120 may include the target resonator 121, a matching control 123 to perform resonance frequency or impedance matching, and a target unit 125 to transfer the received resonance power to a device or a load.

The target resonator 121 may be configured to receive the electromagnetic energy from the source resonator 115. The target resonator 121 may be configured to resonate within the set resonance bandwidth.

The matching control 123 may set at least one of a resonance bandwidth of the target resonator 121 and an impedance matching frequency of the target resonator 121. In some instances, the matching control 123 may include at least one of a target resonance bandwidth setting unit and a target matching frequency setting unit. The target resonance bandwidth setting unit may set the resonance bandwidth of the target resonator 121. The target matching frequency setting unit may be configured to set the impedance matching frequency of the target resonator 121. For example, a Q-factor of the target resonator 121 may be determined based on setting of the resonance bandwidth of the target resonator 121 or setting of the impedance matching frequency of the target resonator 121.

The target unit 125 may be configured to transfer the received resonance power to the load. The target unit 125 may include an AC/DC converter and a DC/DC converter. The AC/DC converter may generate a DC voltage by rectifying an AC signal transmitted from the source resonator 115 to the target resonator 121. And the DC/DC converter may supply a rated voltage to a device or the load by adjusting a voltage level of the DC voltage. For example, the AC/DC converter may be configured as an active rectifier utilizing a delay locked loop.

In one or more embodiments, the source resonator 115 and the target resonator 121 may be configured as a helix coil structured resonator, a spiral coil structured resonator, a meta-structured resonator, or the like.

Referring to FIG. 1, controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121 in some instances. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

For a wireless power transmission employing a resonance scheme, the resonance bandwidth may be an important factor. When the Q-factor (e.g., considering all of a change in a distance between the source resonator 115 and the target resonator 121, a change in the resonance impedance, impedance mismatching, a reflected signal, and/or the like), is Qt, Qt may have an inverse-proportional relationship with the resonance bandwidth, as given by Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. In Equation 1, the BW-factor may indicate either $1/BW_S$ or $1/BW_D$.

Due to an external effect, for example, a change in the distance between the source resonator 115 and the target resonator 121, a change in a location of at least one of the source resonator 115 and the target resonator 121, and/or the like, impedance mismatching between the source resonator 115 and the target resonator 121 may occur. The impedance mismatching may be a direct cause in decreasing an efficiency of power transfer. When a reflected wave corresponding to a transmission signal that is partially reflected and returned is detected, the matching control 113 may be configured to determine the impedance mismatching has occurred, and may perform impedance matching. The matching control 113 may change a resonance frequency by detecting a resonance point through a waveform analysis of the reflected wave. The matching control 113 may determine, as the resonance frequency, a frequency having a minimum amplitude in the waveform of the reflected wave.

The source resonator 115 and/or the target resonator 121 in FIG. 1 may have a resonator structure illustrated in FIGS. 6 through 12.

Figure 2:
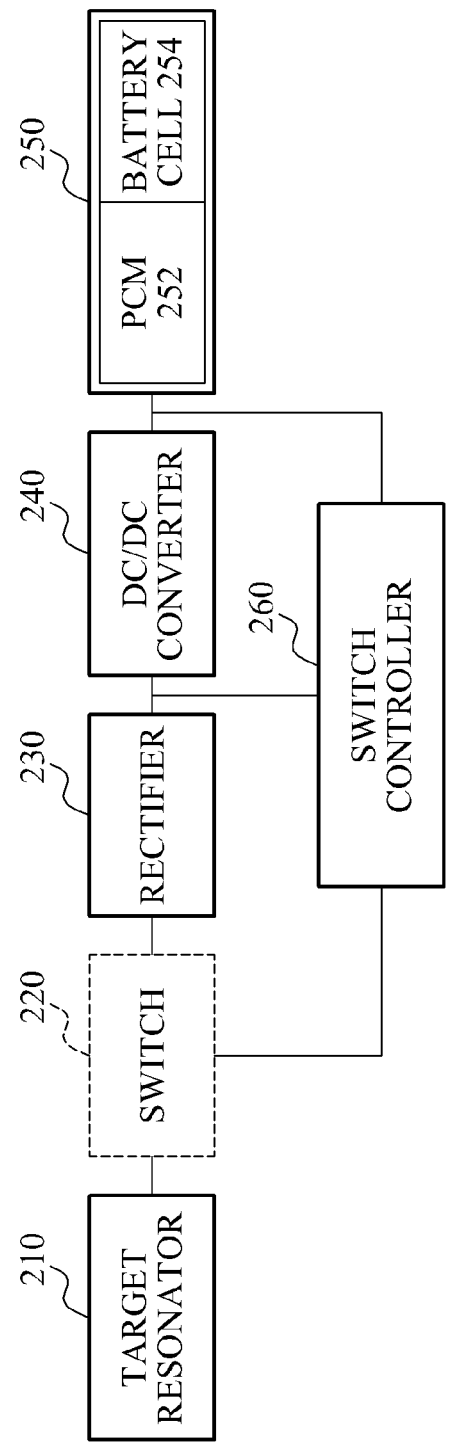
FIG. 2 is a diagram illustrating a wireless power receiver including a protector.

FIG. 2 illustrates a wireless power receiver including a protector.

As shown, the wireless power receiver may include a target resonator 210, a switch 220, a rectifier 230, a direct current/direct current (DC/DC) converter 240, a battery 250, and a switch controller 260.

The target resonator 210 may be configured to receive electromagnetic energy from a source resonator.

The switch 222 may include a switch or switch element such as, for example, an electromechanical switch (e.g., contact, toggle, knife, tilt, or the like) or an electrical switch (e.g., solenoid, relays, or solid-state elements such as a transistor switch, silicon-controlled rectifier or a triac) configured to control current flow between the target resonator 210 and the rectifier 230. Of course, other types of switches are also possible. In various embodiments, the switch 222 may be configured to be activated. For example, the switch 222 may select between ON and OFF positions, which permits and prevents the flow of electricity (power), respectively. Accordingly, the switch controls may control electrical connection from the target resonator 210 to the rectifier 230. When the switch 220 is turned ON, based on a control by the switch controller 260, the switch 220 may allow a current to flow through a connection between the target resonator 210 and the rectifier 230 and may provide, to the rectifier 230, an AC signal received from the target resonator 210. And when the switch 220 is turned OFF, the switch 220 may disconnect the connection between the target resonator 210 and the rectifier 230.

The rectifier 230 may be configured to rectify the AC signal received from the target resonator 210, to generate a DC signal.

The DC/DC converter 240 may be configured to adjust a signal level of the DC signal generated from the rectifier 230, and may output a rated voltage.

The battery 250 may receive the rated voltage outputted from the DC/DC converter 240, and is charged with the received rated voltage.

The battery 250 may include a protection circuit module (PCM) 252 and a battery cell 254. The battery cell 254 may be charged with the rated voltage outputted from the DC/DC converter 240. The PCM 252 may disconnect a charging path to protect the battery cell 254 when over-charging, over-discharging, or over-current occurs. The PCM 252 may block the rated voltage outputted from the DC/DC converter 240 when the charging of the battery cell 254 is completed.

The switch controller 260 may be configured to compare, with a predetermined threshold value, a voltage difference between of an output voltage of the rectifier 230 and an output voltage of the DC/DC converter 240. When the voltage difference is greater than the predetermined threshold value, the switch controller 260 may turn the switch 220 OFF, and when the voltage difference is less than or equal to the predetermined threshold value, the switch controller 260 may turn the switch 2200N.

Figure 3:
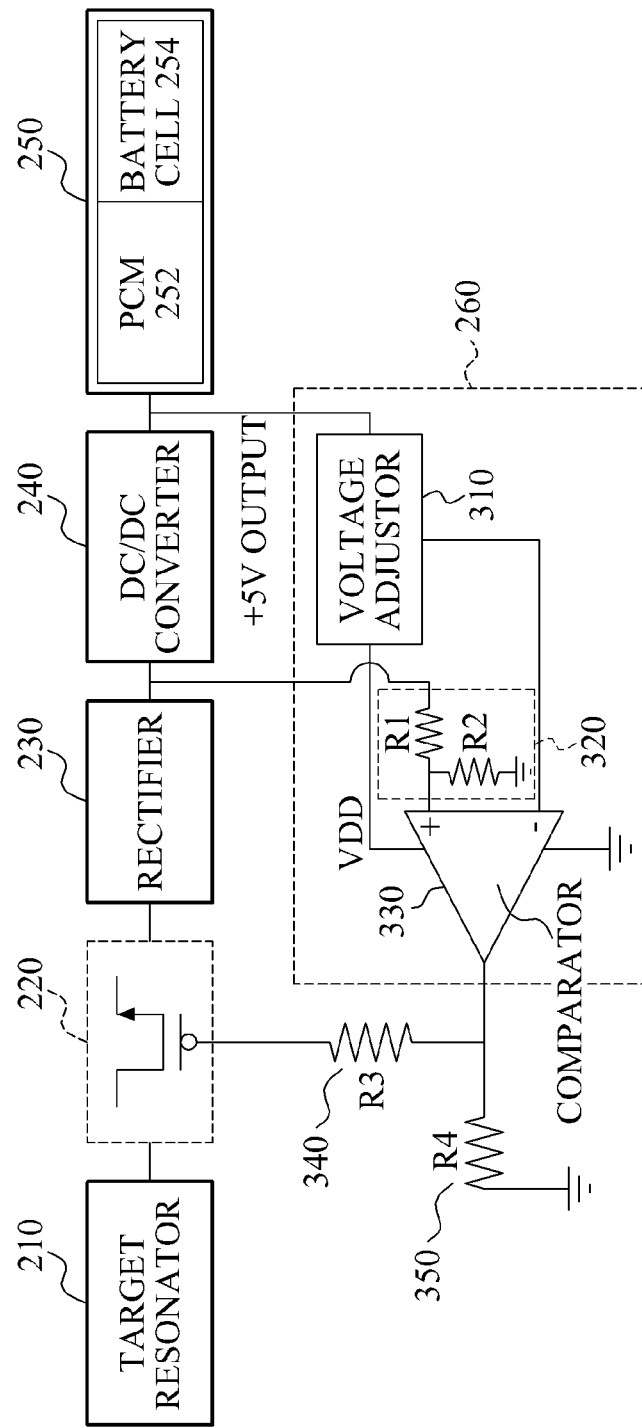
FIG. 3 is a diagram illustrating a protector.

FIG. 3 illustrates a protector for use with the wireless power receiver of FIG. 2.

As shown, the switch controller 260 depicted in FIG. 2 may include a voltage adjustor 310, a voltage divider 320, and a comparator 330.

The voltage adjustor 310 may be configured to decrease an output voltage of the DC/DC converter 240 to a predetermined voltage, and may output the decreased output voltage. For example, the voltage adjustor 310 may adjust the output voltage of the DC/DC converter 240 to 3.3 V. In one embodiment, as shown, the output voltage from the DC/DC converter 240 may be +5 V.

The voltage divider 320 may be configured to divide a voltage, in a predetermined ratio, from the output voltage of the rectifier 230, and may output the divided voltage. The voltage divider 320 may include, for instance, two resistors, that is, a first resistor (R1) and a second resistor (R2). For example, in some implementations, the predetermined ratio may be 1/3 of the output voltage of the rectifier 230 by configuring the first and second resistors R1 and R2.

The comparator 330 may be configured to compare the predetermined voltage from the voltage adjustor 310 with the divided voltage from the voltage divider 320, and may output the predetermined voltage as a control voltage. And the control voltage is used to control the switch 220 when the predetermined voltage is less than or equal to the divided voltage. In one embodiment, as shown, the comparator 330 may receive positive power voltage (VDD) directly from the voltage adjustor 310. The comparator 330 may be configured to compare the predetermined voltage with the divided voltage, and may output a control voltage, as the control signal, that controls the switch 220 when the predetermined voltage is greater than the divided voltage. For example, in one instance, the control voltage may be 0V and when the voltage adjustor 310 outputs a voltage of 3.3 V and the voltage divider 320 outputs 1/3 of the output voltage of the rectifier 230, the comparator 330 may output the control voltage of 0 V to control the switch 220 when the output voltage of the rectifier 230 is less than 10 V, and may output the control voltage of 3.3 V to control the switch 220 when the output voltage of the rectifier 230 is greater than or equal to 10 V. Other voltage values may be similarly used in other embodiments.

A third resistor (R3) 340 may be used to further provide a resistance to protect against over-current between the switch 220 and the switch controller 260. In one embodiment, the R3 340 may have a resistance of 100 Ω.

A fourth resistor (R4) 350 may be used to further provide a resistance to maintain the switch 220 to be turned ON, for example, with 0 V, when wireless power transmission is initially operational. In one embodiment, the R4 350 may have a resistance of 10 kΩ. It will be appreciated that the resistances of R3 and/or R4 may have different values in other embodiments.

The switch 220 may be controlled by the switch controller 260 and may be a p-channel metal-oxide semiconductor (PMOS) transistor. As mentioned above, in one embodiment, the switch 220 may be turned ON when a voltage of 0 V is inputted from the switch controller 260, and may be turned OFF when a voltage of 3.3 V is inputted from the switch controller 260.

Figure 4:
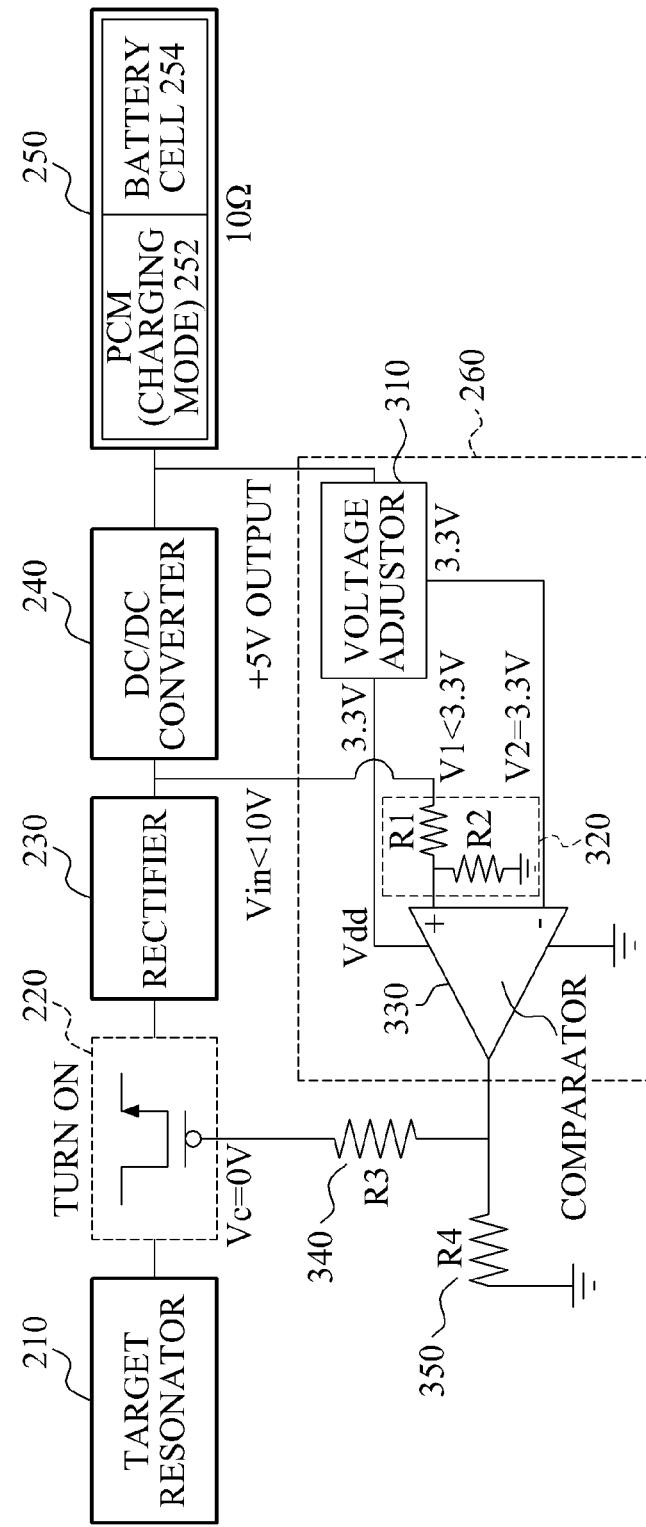
FIG. 4 is a diagram illustrating an operation of a protector when a battery is being charged.

FIG. 4 illustrates an operation of a protector when the battery 250 is being charged.

In one embodiment, the switch 220 may include a PMOS transistor. Vc may be equal to 0V when wireless power is initially provided, for instance. The switch 220 is intended to be maintained to be in an ON state.

The PCM 252 may not operate when the battery is in a charging mode and thus, an impedance of the battery 250 may be about 10Ω. For example, an input voltage (Vin) of the DC/DC converter 240 may not exceed the 10 V.

Using a predetermined ratio of 1/3, 1/3 of Vin may be divided, by the voltage divider, from Vin, and may be inputted to the comparator 330 as an input (V1). V2 may be a reference voltage of 3.3 V, for example, that is, a predetermined voltage received from the voltage adjustor 310. The comparator 330 may output, as an output, 0 V that is a ground (GND), since V2 is greater than V1, and the switch 220 may be maintained to be in an on state.

Figure 5:
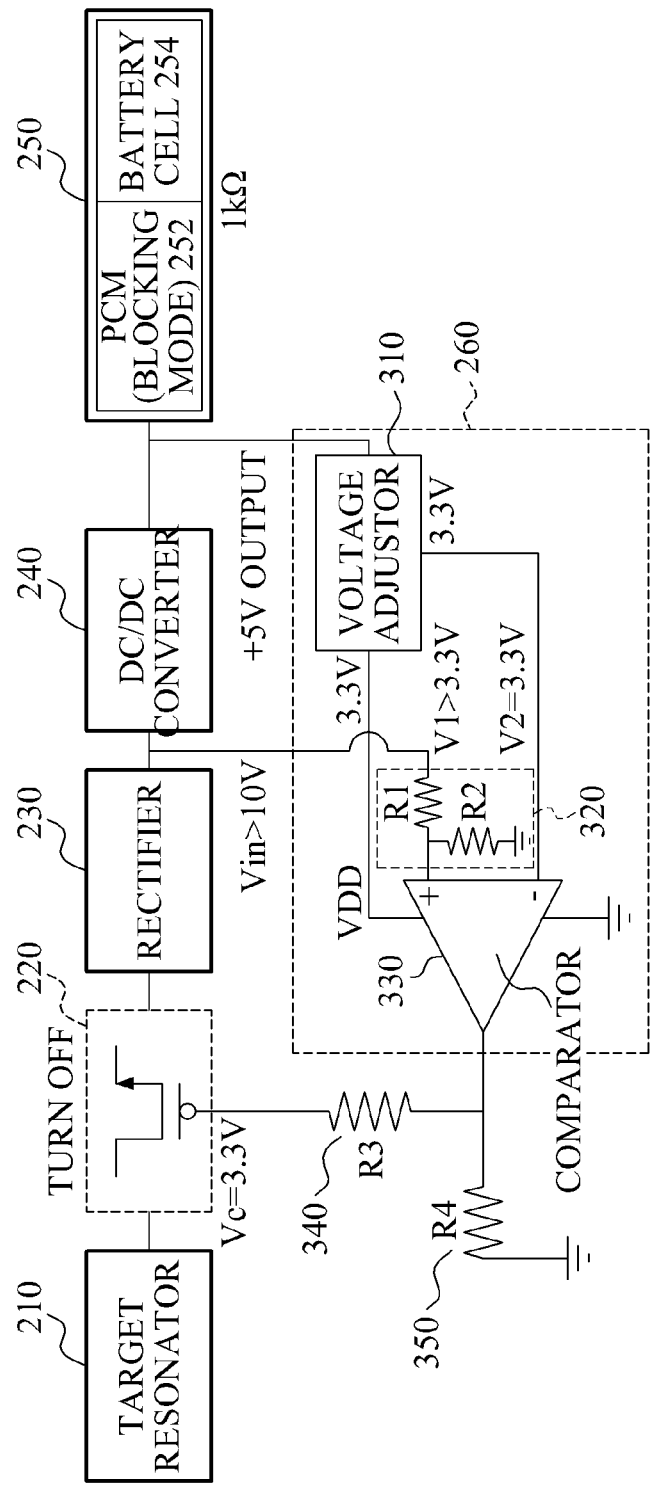
FIG. 5 is a diagram illustrating an operation of a protector when charging of a battery is completed.

FIG. 5 illustrates an operation of a protector when charging of a battery is completed.

When charging of the battery cell 254 is completed, the PCM 252 blocks power to the battery cell 254, and an impedance of the battery 250 may be about 1 kn. For example, an input voltage (Vin) of the DC/DC converter 240 may be greater than 10V. Using a predetermined ratio of 1/3, 1/3 of Vin may be divided from Vin and may be inputted to the comparator 330 as an input voltage (V1). V2 may be a reference voltage of 3.3V, for example, that is, a predetermined voltage received from the voltage adjustor 310. In the blocking mode, V1 is greater than V2 and thus, the comparator 330 may output 3.3 V as an output (Vdd), and the switch 220 may be in an OFF state.

When the PCM 252 operates in a blocking mode, the battery 250 may be in an open state that blocks power and thus, a voltage level of a voltage, with which a capacitor of the rectifier 230 is charged, may be maintained. Therefore, the switch controller 260 may maintain the switch 220 as an OFF state until the blocking mode of the PCM 252 is changed.

While the protector has been described above for use with a wireless power receiver, it will be appreciated that the protector may be used with various other electronic devices having a rectifier to protect the same.

Referring again to FIG. 1, the source resonator 115 and/or a target resonator 121 of the wireless power transmission system may be configured as a helix coil structured resonator, a spiral coil structured resonator, a meta-structured resonator, and/or the like.

One or more of the materials of the resonator embodiments disclosed herein may be metamaterials. An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a given magnetic field in a corresponding material and a magnetic flux density occurring with respect to the given magnetic field in a vacuum state. The permittivity indicates a ratio between an electric flux density, occurring with respect to a given electric field, in a corresponding material and an electric flux density, occurring with respect to the given electric field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area, for instance.

Figure 6:
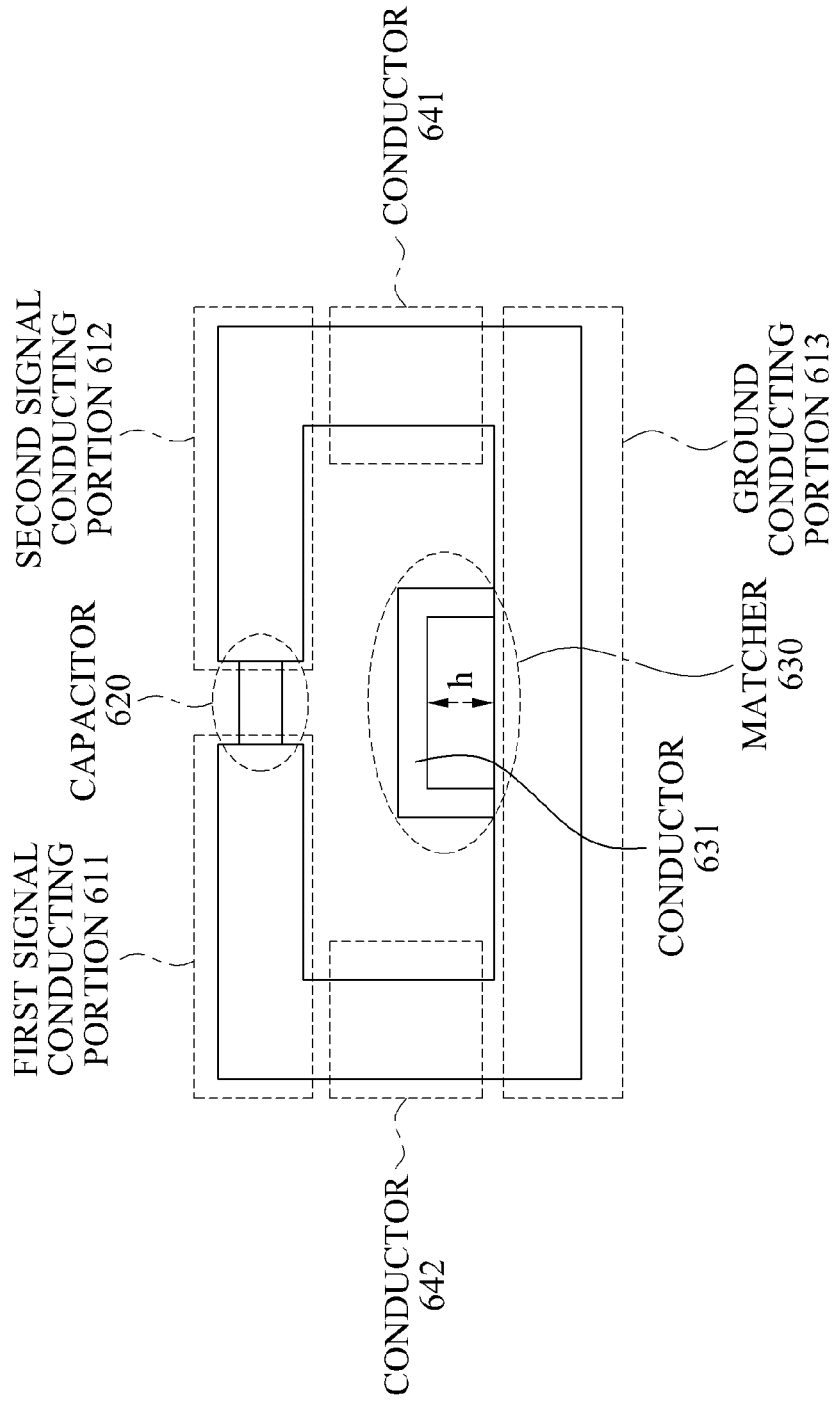

FIG. 6 illustrates a resonator 600 having a two-dimensional (2D) structure.

As shown, the resonator 600 having the 2D structure may include a transmission line, a capacitor 620, a matcher 630, and conductors 641 and 642. The transmission line may include, for instance, a first signal conducting portion 611, a second signal conducting portion 612, and a ground conducting portion 613.

The capacitor 620 may be inserted or otherwise positioned in series between the first signal conducting portion 611 and the second signal conducting portion 612 so that an electric field may be confined within the capacitor 620. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As shown in FIG. 6, the resonator 600 may be configured to have a generally 2D structure. The transmission line may include the first signal conducting portion 611 and the second signal conducting portion 612 in the upper portion of the transmission line, and may include the ground conducting portion 613 in the lower portion of the transmission line. As shown, the first signal conducting portion 611 and the second signal conducting portion 612 may be disposed to face the ground conducting portion 613 with current flowing through the first signal conducting portion 611 and the second signal conducting portion 612.

In some implementations, one end of the first signal conducting portion 611 may be electrically connected (i.e., shorted) to the conductor 642, and another end of the first signal conducting portion 611 may be connected to the capacitor 620. And one end of the second signal conducting portion 612 may be grounded to the conductor 641, and another end of the second signal conducting portion 612 may be connected to the capacitor 620. Accordingly, the first signal conducting portion 611, the second signal conducting portion 612, the ground conducting portion 613, and the conductors 641 and 642 may be connected to each other, such that the resonator 600 may have an electrically "closed-loop structure." The term "closed-loop structure" as used herein, may include a polygonal structure, for example, a circular structure, a rectangular structure, or the like that is electrically closed.

The capacitor 620 may be inserted into an intermediate portion of the transmission line. For example, the capacitor 620 may be inserted into a space between the first signal conducting portion 611 and the second signal conducting portion 612. The capacitor 620 may be configured, in some instances, as a lumped element, a distributed element, or the like. In one implementation, a distributed capacitor may be configured as a distributed element and may include zigzagged conductor lines and a dielectric material having a relatively high permittivity between the zigzagged conductor lines.

When the capacitor 620 is inserted into the transmission line, the resonator 600 may have a property of a metamaterial, as discussed above. For example, the resonator 600 may have a negative magnetic permeability due to the capacitance of the capacitor 620. If so, the resonator 600 may be referred to as a mu negative (MNG) resonator. Various criteria may be applied to determine the capacitance of the capacitor 620. For example, the various criteria for enabling the resonator 600 to have the characteristic of the metamaterial may include one or more of the following: a criterion for enabling the resonator 600 to have a negative magnetic permeability in a target frequency, a criterion for enabling the resonator 600 to have a zeroth order resonance characteristic in the target frequency, or the like. The resonator 600, also referred to as the MNG resonator 600, may also have a zeroth order resonance characteristic (i.e., having, as a resonance frequency, a frequency when a propagation constant is "0"). If the resonator 600 has the zeroth order resonance characteristic, the resonance frequency may be independent with respect to a physical size of the MNG resonator 600. Moreover, by appropriately designing the capacitor 620, the MNG resonator 600 may sufficiently change the resonance frequency without substantially changing the physical size of the MNG resonator 600 may not be changed.

In a near field, for instance, the electric field may be concentrated on the capacitor 620 inserted into the transmission line. Accordingly, due to the capacitor 620, the magnetic field may become dominant in the near field. In one or more embodiments, the MNG resonator 600 may have a relatively high Q-factor using the capacitor 620 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 600 may include a matcher 630 for impedance matching. For example, the matcher 630 may be configured to appropriately determine and adjust the strength of a magnetic field of the MNG resonator 600, for instance. Depending on the configuration, current may flow in the MNG resonator 600 via a connector, or may flow out from the MNG resonator 600 via the connector. The connector may be connected to the ground conducting portion 613 or the matcher 630. In some instances, power may be transferred through coupling without using a physical connection between the connector and the ground conducting portion 613 or the matcher 630.

As shown in FIG. 6, the matcher 630 may be positioned within the loop formed by the loop structure of the resonator 600. The matcher 630 may adjust the impedance of the resonator 600 by changing the physical shape of the matcher 630. For example, the matcher 630 may include the conductor 631 for the impedance matching positioned in a location that is separate from the ground conducting portion 613 by a distance h. Accordingly, the impedance of the resonator 600 may be changed by adjusting the distance h.

In some instances, a controller may be provided to control the matcher 630 which generates and transmits a control signal to the matcher 630 directing the matcher to change its physical shape so that the impedance of the resonator may be adjusted. For example, the distance h between the conductor 631 of the matcher 630 and the ground conducting portion 613 may be increased or decreased based on the control signal. The controller may generate the control signal based on various factors As shown in FIG. 6, the matcher 630 may be configured as a passive element such as the conductor 631, for example. Of course, in other embodiments, the matcher 630 may be configured as an active element such as a diode, a transistor, or the like. If the active element is included in the matcher 630, the active element may be driven based on the control signal generated by the controller, and the impedance of the resonator 600 may be adjusted based on the control signal. For example, when the active element is a diode included in the matcher 630 the impedance of the resonator 600 may be adjusted depending on whether the diode is in an ON state or in an OFF state.

In some instances, a magnetic core may be further provided to pass through the MNG resonator 600. The magnetic core may perform a function of increasing a power transmission distance.

Figure 7:
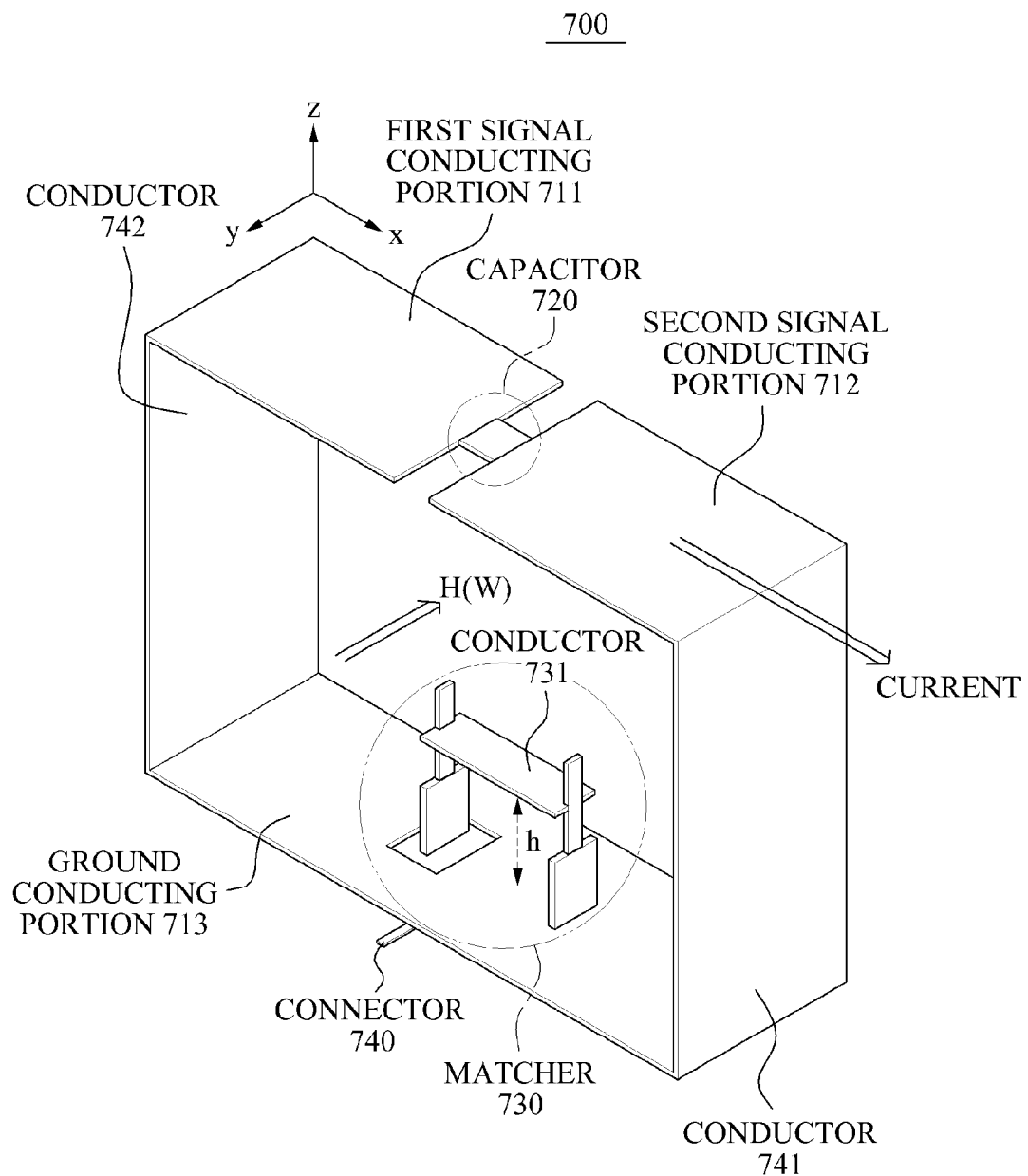

FIG. 7 illustrates a resonator 700 having a three-dimensional (3D) structure.

Referring to FIG. 7, the resonator 700 having the 3D structure may include a transmission line and a capacitor 720. The transmission line may include a first signal conducting portion 711, a second signal conducting portion 712, and a ground conducting portion 713. The capacitor 720 may be inserted, for instance, in series between the first signal conducting portion 711 and the second signal conducting portion 712 of the transmission link such that an electric field may be confined within the capacitor 720.

As shown in FIG. 7, the resonator 700 may have a generally 3D structure. The transmission line may include the first signal conducting portion 711 and the second signal conducting portion 712 in an upper portion of the resonator 700, and may include the ground conducting portion 713 in a lower portion of the resonator 700. The first signal conducting portion 711 and the second signal conducting portion 712 may be disposed to face the ground conducting portion 713. In this arrangement, current may flow in an x direction through the first signal conducting portion 711 and the second signal conducting portion 712. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 711 may be electrically connected (i.e., shorted) to a conductor 742, and another end of the first signal conducting portion 711 may be connected to the capacitor 720. One end of the second signal conducting portion 712 may be grounded to a conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, whereby the resonator 700 may have an electrically closed-loop structure. As shown in FIG. 7, the capacitor 720 may be inserted or otherwise positioned between the first signal conducting portion 711 and the second signal conducting portion 712. For example, the capacitor 720 may be inserted into a space between the first signal conducting portion 711 and the second signal conducting portion 712. The capacitor 720 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 720 is inserted into the transmission line, the resonator 700 may have a property of a metamaterial, in some instances, as discussed above.

For example, when a capacitance of the capacitor inserted is a lumped element, the resonator 700 may have the characteristic of the metamaterial. When the resonator 700 has a negative magnetic permeability by appropriately adjusting the capacitance of the capacitor 720, the resonator 700 may also be referred to as an MNG resonator. Various criteria may be applied to determine the capacitance of the capacitor 720. For example, the various criteria may include, for instance, one or more of the following: a criterion for enabling the resonator 700 to have the characteristic of the metamaterial, a criterion for enabling the resonator 700 to have a negative magnetic permeability in a target frequency, a criterion enabling the resonator 700 to have a zeroth order resonance characteristic in the target frequency, or the like. Based on at least one criterion among the aforementioned criteria, the capacitance of the capacitor 720 may be determined.

The resonator 700, also referred to as the MNG resonator 700, may have a zeroth order resonance characteristic (i.e., having, as a resonance frequency, a frequency when a propagation constant is "0"). If the resonator 700 has a zeroth order resonance characteristic, the resonance frequency may be independent with respect to a physical size of the MNG resonator 700. Thus, by appropriately designing the capacitor 720, the MNG resonator 700 may sufficiently change the resonance frequency without substantially changing the physical size of the MNG resonator 700 may not be changed.

Referring to the MNG resonator 700 of FIG. 7, in a near field, the electric field may be concentrated on the capacitor 720 inserted into the transmission line. Accordingly, due to the capacitor 720, the magnetic field may become dominant in the near field. And, since the MNG resonator 700 having the zeroth-order resonance characteristic may have characteristics similar to a magnetic dipole, the magnetic field may become dominant in the near field. A relatively small amount of the electric field formed due to the insertion of the capacitor 720 may be concentrated on the capacitor 720 and thus, the magnetic field may become further dominant.

Also, the MNG resonator 700 may include a matcher 730 for impedance matching. The matcher 730 may be configured to appropriately adjust the strength of magnetic field of the MNG resonator 700. The impedance of the MNG resonator 700 may be determined by the matcher 730. In one or more embodiments, current may flow in the MNG resonator 700 via a connector 740, or may flow out from the MNG resonator 700 via the connector 740. And the connector 740 may be connected to the ground conducting portion 713 or the matcher 730.

As shown in FIG. 7, the matcher 730 may be positioned within the loop formed by the loop structure of the resonator 700. The matcher 730 may be configured to adjust the impedance of the resonator 700 by changing the physical shape of the matcher 730. For example, the matcher 730 may include a conductor 731 for the impedance matching in a location separate from the ground conducting portion 713 by a distance h. The impedance of the resonator 700 may be changed by adjusting the distance h.

In some implementations, a controller may be provided to control the matcher 730. In this case, the matcher 730 may change the physical shape of the matcher 730 based on a control signal generated by the controller. For example, the distance h between the conductor 731 of the matcher 730 and the ground conducting portion 713 may be increased or decreased based on the control signal. Accordingly, the physical shape of the matcher 730 may be changed such that the impedance of the resonator 700 may be adjusted. The distance h between the conductor 731 of the matcher 730 and the ground conducting portion 713 may be adjusted using a variety of schemes. For example, a plurality of conductors may be included in the matcher 730 and the distance h may be adjusted by adaptively activating one of the conductors. Alternatively or additionally, the distance h may be adjusted by adjusting the physical location of the conductor 731 up and down. For instance, the distance h may be controlled based on the control signal of the controller. The controller may generate the control signal using various factors. As shown in FIG. 7, the matcher 730 may be configured as a passive element such as the conductor 731, for instance. Of course, in other embodiments, the matcher 730 may be configured as an active element such as a diode, a transistor, or the like. When the active element is included in the matcher 730, the active element may be driven based on the control signal generated by the controller, and the impedance of the resonator 700 may be adjusted based on the control signal. For example, if the active element is a diode included in the matcher 730, the impedance of the resonator 700 may be adjusted depending on whether the diode is in an ON state or in an OFF state.

In some implementations, a magnetic core may be further provided to pass through the resonator 700 configured as the MNG resonator. The magnetic core may perform a function of increasing a power transmission distance.

Figure 8:
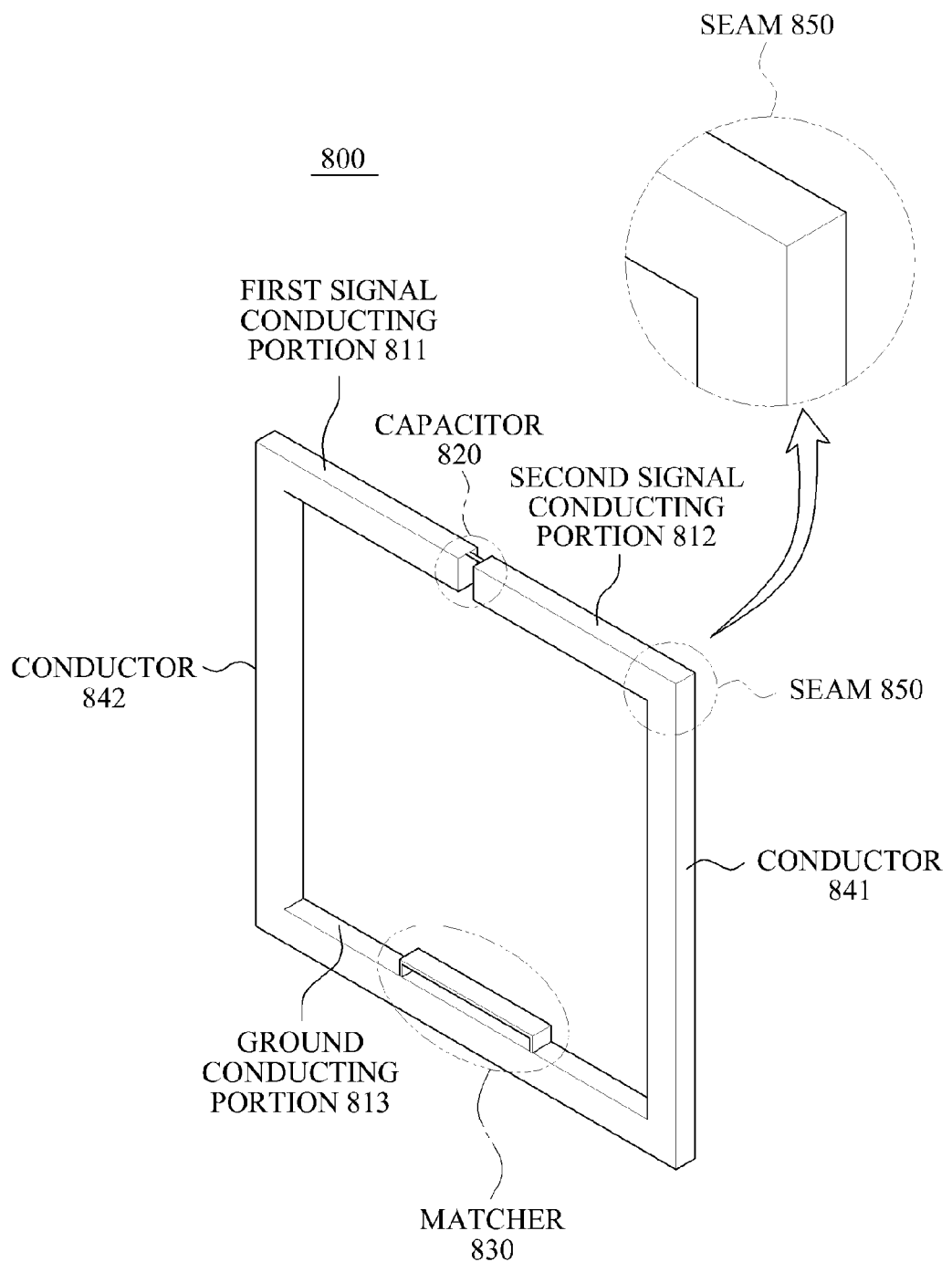

FIG. 8 illustrates a resonator 800 for a wireless power transmission configured as a bulky type.

As used herein, the term "bulky type" may refer to a seamless connection connecting at least two parts in an integrated form.

Referring to FIG. 8, a first signal conducting portion 811 and a conductor 842 may be integrally formed instead of being separately manufactured and thereby be connected to each other. Similarly, the second signal conducting portion 812 and a conductor 841 may also be integrally manufactured.

When the second signal conducting portion 812 and the conductor 841 are separately manufactured and then are connected to each other, a loss of conduction may occur due to a seam 850. Thus, in some implementations, the second signal conducting portion 812 and the conductor 841 may be connected to each other without using a separate seam (i.e., seamlessly connected to each other). Accordingly, it is possible to decrease a conductor loss caused by the seam 850. For instance, the second signal conducting portion 812 and a ground conducting portion 831 may be seamlessly and integrally manufactured. Similarly, the first signal conducting portion 811, the conductor 842 and the ground conducting portion 831 may be seamlessly and integrally manufactured.

A matcher 830 may be provided that is similarly constructed as described herein in one or more embodiments.

Figure 9:
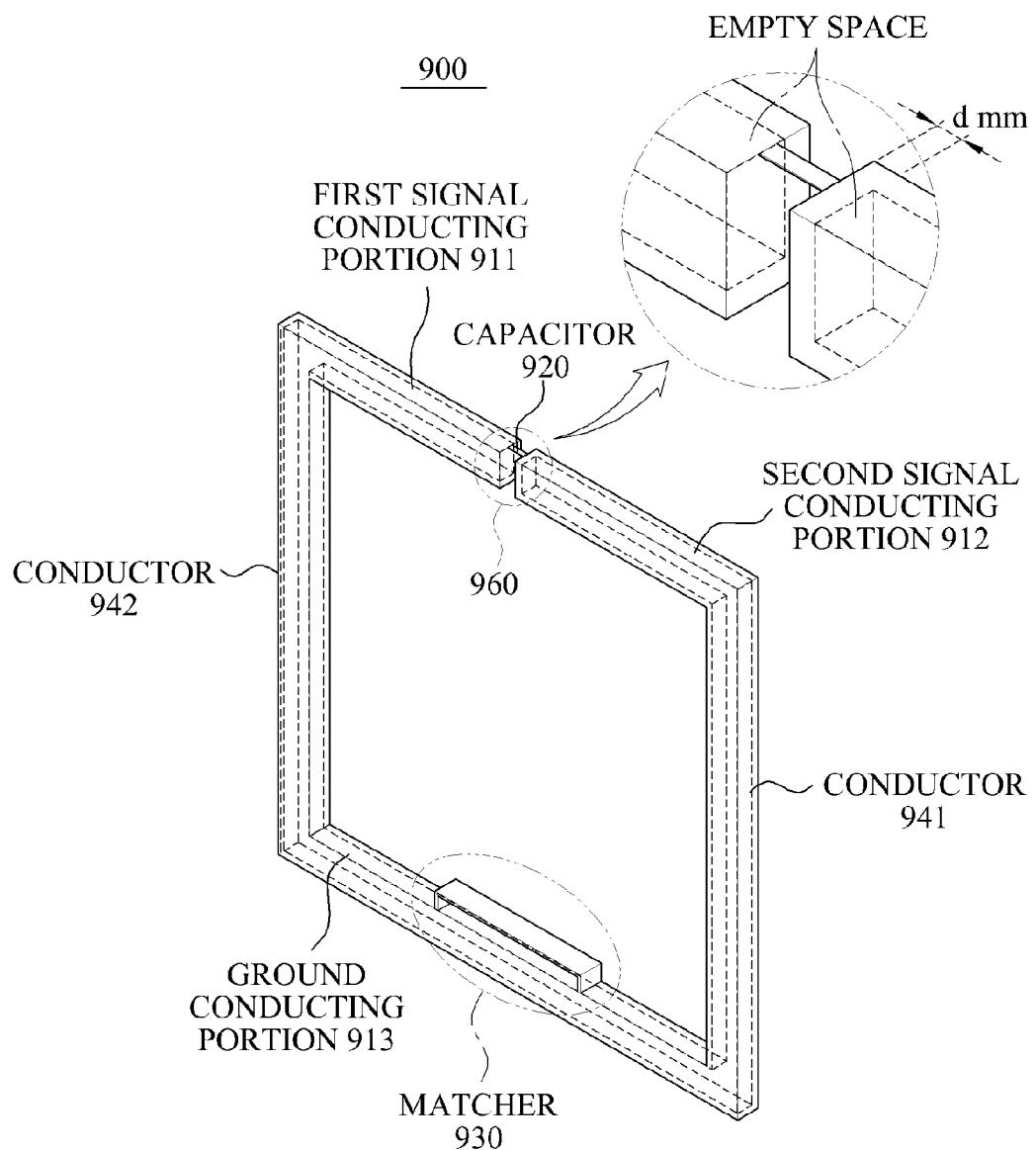

FIG. 9 illustrates a resonator 900 for a wireless power transmission, configured as a hollow type.

Referring to FIG. 9, each of a first signal conducting portion 911, a second signal conducting portion 912, a ground conducting portion 913, and conductors 941 and 942 of the resonator 900 configured as the hollow type structure. As used herein the term "hollow type" refers to a configuration that may include an empty space inside.

For a given resonance frequency, an active current may be modeled to flow in only a portion of the first signal conducting portion 911 instead of all of the first signal conducting portion 911, the second signal conducting portion 912 instead of all of the second signal conducting portion 912, the ground conducting portion 913 instead of all of the ground conducting portion 913, and the conductors 941 and 942 instead of all of the conductors 941 and 942. When a depth of each of the first signal conducting portion 911, the second signal conducting portion 912, the ground conducting portion 913, and the conductors 941 and 942 is significantly deeper than a corresponding skin depth in the given resonance frequency, it may be ineffective. The significantly deeper depth may, however, increase a weight or manufacturing costs of the resonator 900 in some instances.

Accordingly, for the given resonance frequency, the depth of each of the first signal conducting portion 911, the second signal conducting portion 912, the ground conducting portion 913, and the conductors 941 and 942 may be appropriately determined based on the corresponding skin depth of each of the first signal conducting portion 911, the second signal conducting portion 912, the ground conducting portion 913, and the conductors 941 and 942. When each of the first signal conducting portion 911, the second signal conducting portion 912, the ground conducting portion 913, and the conductors 941 and 942 has an appropriate depth deeper than a corresponding skin depth, the resonator 900 may become light, and manufacturing costs of the resonator 900 may also decrease.

For example, as shown in FIG. 9, the depth of the second signal conducting portion 912 (as further illustrated in the enlarged view region 960 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 911, the second signal conducting portion 912, the ground conducting portion 913, and the conductors 941 and 942 are made of a copper and they may have a conductivity of $5.8 \times 10^7$ siemens per meter ($S \cdot m^{-1}$), the skin depth may be about 0.6 mm with respect to 10 kHz of the resonance frequency and the skin depth may be about 0.006 mm with respect to 100 MHz of the resonance frequency.

A capacitor 920 and a matcher 930 may be provided that are similarly constructed as described herein in one or more embodiments.

Figure 10:
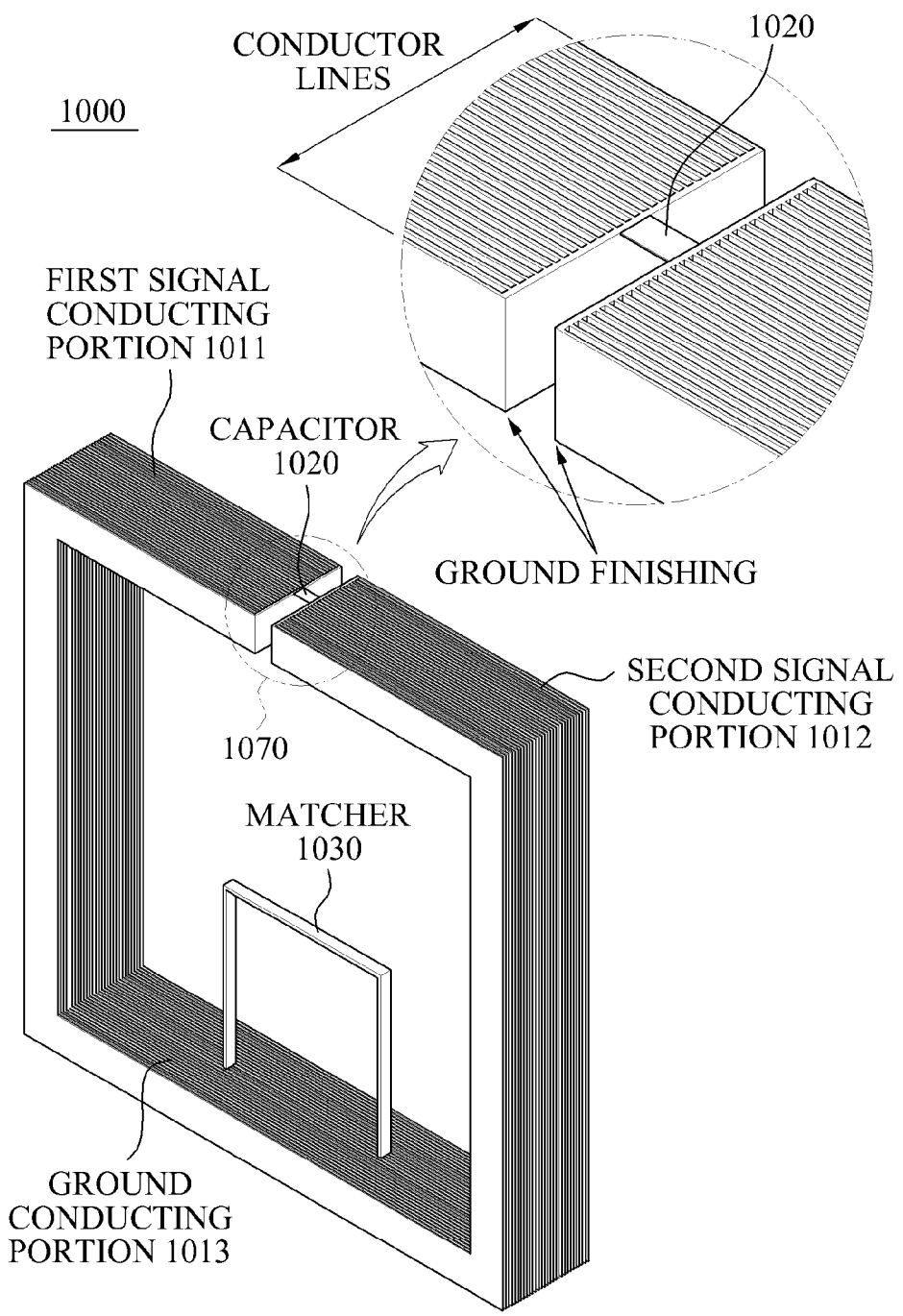

FIG. 10 illustrates a resonator 1000 for a wireless power transmission using a parallel-sheet.

Referring to FIG. 10, the parallel-sheet may be applicable to each of a first signal conducting portion 1011 and a second signal conducting portion 1012 included in the resonator 1000.

Each of the first signal conducting portion 1011 and the second signal conducting portion 1012 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1011 and the second signal conducting portion 1012, it may be possible to decrease the ohmic loss, and to increase the Q-factor and the coupling effect. Referring to the enlarged view portion 1070 indicated by a circle, when the parallel-sheet is applied, each of the first signal conducting portion 1011 and the second signal conducting portion 1012 may include a plurality of conductor lines. The plurality of conductor lines may be disposed in parallel, and may be electrically connected (i.e., shorted) at an end portion of each of the first signal conducting portion 1011 and the second signal conducting portion 1012.

When the parallel-sheet is applied to each of the first signal conducting portion 1011 and the second signal conducting portion 1012, the plurality of conductor lines may be disposed in parallel. Accordingly, a sum of resistances having the conductor lines may decrease. Consequently, the resistance loss may decrease, and the Q-factor and the coupling effect may increase.

A capacitor 1020 and a matcher 1030 positioned on the ground conducting portion 1013 may be provided that are similarly constructed as described herein in one or more embodiments.

FIG. 11 illustrates a resonator 1100 for a wireless power transmission, the resonator including a distributed capacitor.

Referring to FIG. 11, a capacitor 1120 included in the resonator 1100 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1120 as a distributed element, it may be possible to decrease the ESR. As will be appreciated, a loss caused by the ESR may decrease a Q-factor and a coupling effect.

As shown in FIG. 11, the capacitor 1120 may be configured as a conductive line having the zigzagged structure.

By employing the capacitor 1120 as the distributed element, it may be possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 12A:
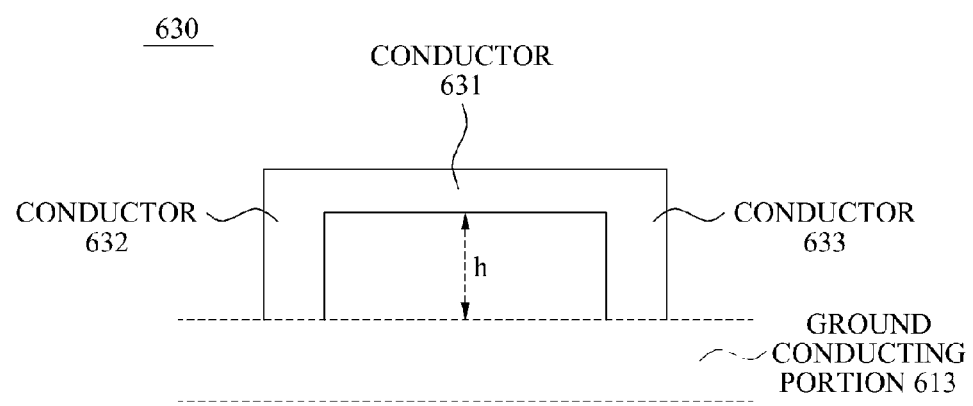
Figure 12B:
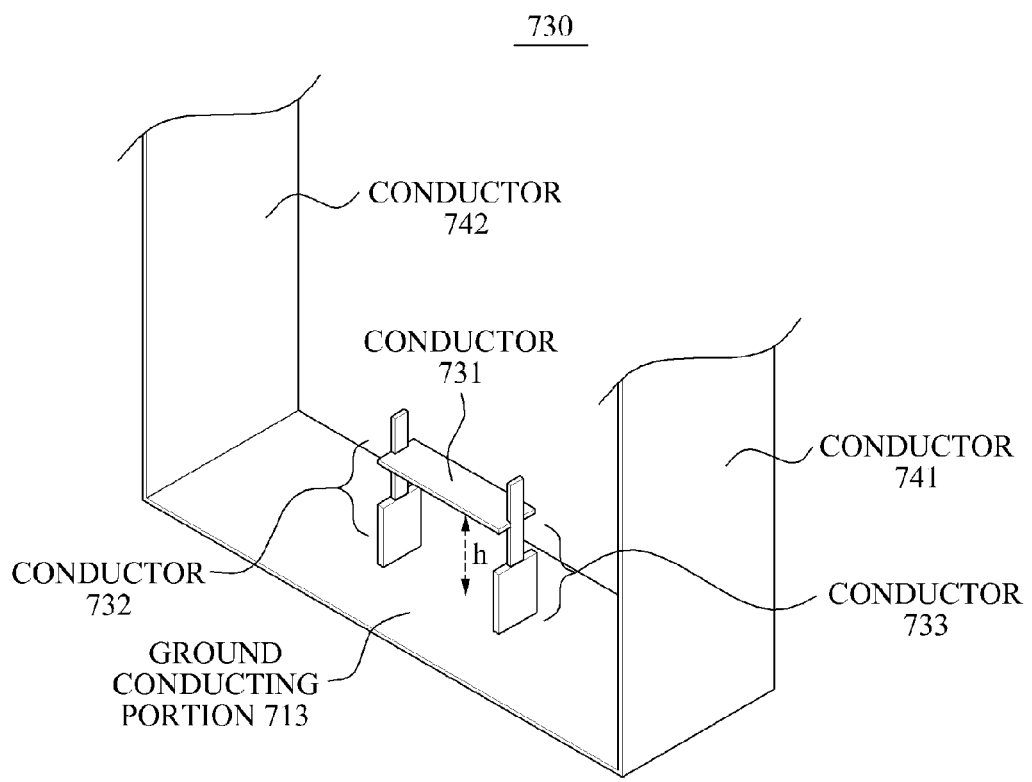

FIG. 12A illustrates one embodiment of the matcher 630 used in the resonator 600 provided in the 2D structure of FIG. 6, and FIG. 12B illustrates an example of the matcher 730 used in the resonator 700 provided in the 3D structure of FIG. 7.

FIG. 12A illustrates a portion of the 2D resonator including the matcher 630, and FIG. 12B illustrates a portion of the 3D resonator of FIG. 7 including the matcher 730.

Referring to FIG. 12A, the matcher 630 may include the conductor 631, a conductor 632, and a conductor 633. The conductors 632 and 633 may be connected to the ground conducting portion 613 and the conductor 631. The impedance of the 2D resonator may be determined based on a distance h between the conductor 631 and the ground conducting portion 613. The distance h between the conductor 631 and the ground conducting portion 613 may be controlled by the controller. The distance h between the conductor 631 and the ground conducting portion 613 may be adjusted using a variety of schemes. For example, the variety of schemes may include, for instance, one or more of the following: a scheme of adjusting the distance h by adaptively activating one of the conductors 631, 632, and 633, a scheme of adjusting the physical location of the conductor 631 up and down, and/or the like.

Referring to FIG. 12B, the matcher 730 may include the conductor 731, a conductor 732, a conductor 733 and conductors 741 and 742. The conductors 732 and 733 may be connected to the ground conducting portion 713 and the conductor 731. Also, the conductors 741 and 742 may be connected to the ground conducting portion 713. The impedance of the 3D resonator may be determined based on a distance h between the conductor 731 and the ground conducting portion 713. The distance h between the con-ductor 731 and the ground conducting portion 713 may be controlled by the controller, for example. Similar to the matcher 630 included in the 2D structured resonator, in the matcher 730 included in the 3D structured resonator, the distance h between the conductor 731 and the ground conducting portion 713 may be adjusted using a variety of schemes. For example, the variety of schemes may include, for instance, one or more of the following: a scheme of adjusting the distance h by adaptively activating one of the conductors 731, 732, and 733, a scheme of adjusting the physical location of the conductor 731 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 13:
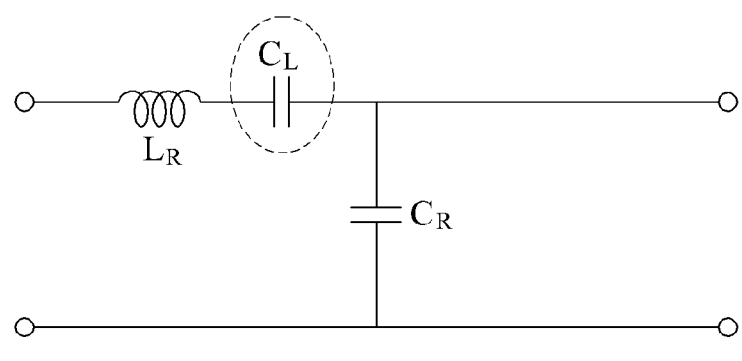
FIG. 13 is a circuit diagram illustrating one equivalent circuit of the resonator for wireless power transmission of FIG. 6.

FIG. 13 illustrates one equivalent circuit of the resonator 600 for the wireless power transmission of FIG. 6.

The resonator 600 of FIG. 6 for the wireless power transmission may be modeled to the equivalent circuit of FIG. 13. In the equivalent circuit depicted in FIG. 13, $L_R$ denotes an inductance of the power transmission line, $C_L$ denotes the capacitor 620 that is inserted in a form of a lumped element in the middle of the power transmission line, and $C_R$ denotes a capacitance between the power transmissions and/or ground of FIG. 6.

In some instances, the resonator 600 may have a zeroth resonance characteristic. For example, when a propagation constant is "0", the resonator 600 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mu zero resonator.

Referring to Equation 2, the resonance frequency $\omega_{MZR}$ of the resonator 600 may be determined by $$\frac{L_R}{C_L}.$$

A physical size of the resonator 600 and the resonance frequency $\omega_{MZR}$ may be independent with respect to each other. Since the physical sizes are independent with respect to each other, the physical size of the resonator 600 may be sufficiently reduced.

One or more embodiments may include a protector and/or a wireless power receiver including the protector, and the protector may control whether to allow power to be inputted, to a rectifier, based on a voltage difference between an output voltage of the rectifier and an output voltage of a DC/DC converter. The protector may detect an open load, indicating that a PCM operates in a blocking mode, and may block power inputted to the rectifier and thus, may prevent damage to the rectifier, caused by the blocking mode of the PCM.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A protector for a wireless power receiver, the protector comprising:
    a switch configured to control current flow to a rectifier of the wireless power receiver, wherein a current flowing through the switch is used to charge a battery of the wireless power receiver; and
    a switch controller configured to:
        detect an output voltage of the rectifier;
        compare, with a predetermined threshold value, a voltage difference between the output voltage of the rectifier and an output voltage of a direct current/direct current (DC/DC) converter of the wireless power reciever, and
        transmit a control signal to the switch (i) to discontinue current flow to the rectifier for protecting the rectifier when the voltage difference is greater than the predetermined threshold value, and (ii) to enable current flow to the rectifier when the voltage difference is less than or equal to the predetermined threshold value,
        wherein the DC/DC converter adjusts a DC signal generated by the rectifier and outputs the output voltage of the DC/DC converter to the battery,
        wherein the voltage difference increases over the predetermined threshold value when a protection circuit module (PCM) of the wireless power receiver operates not to charge the battery, and is maintained under the predetermined threshold value when the PCM does not operate to charge the battery.

2. The protector of claim 1, wherein the switch is configured to enable current flow to the rectifier while the switch is turned on, and to prevent current flow to the rectifier while the switch is turned off.

3. The protector of claim 1, wherein the switch comprises a p-channel metal-oxide semiconductor (PMOS) transistor.

4. The protector of claim 1, wherein the switch controller configured to
    divide a voltage from the output voltage of the rectifier, and to output the divided voltage;
    adjust the output voltage of the DC/DC converter to a predetermined voltage; and
    compare the predetermined voltage with the divided voltage, to output the predetermined voltage, as a control voltage that controls the switch, when the predetermined voltage is less than or equal to the divided voltage, and to output a control voltage, as the control signal, when the predetermined voltage is greater than the divided voltage.

5. The protector of claim 4, wherein the control voltage is about 0 V.

6. The protector of claim 4, wherein the switch controller is configured to divide the voltage from the output voltage of the rectifier by a predetermined ratio and to output the predetermined ratio of the output voltage as the divided voltage.

7. The protector of claim 6, wherein the predetermined ratio is about 1/3.

8. The protector of claim 4, wherein the predetermined voltage is about 3.3 V.

9. The protector of claim 1, further comprising:
    a resistor configured to prevent an over-current between the switch and the switch controller.

10. The protector of claim 2, further comprising:
    a resistor configured to provide a resistance to maintain the switch in an on position.

* * * * *